United States Patent [19]

Berlin

[11] 4,335,892
[45] Jun. 22, 1982

[54] CART WITH IMPROVED STORAGE-PREVENTING BASE

[75] Inventor: Daniel Berlin, Rydal, Pa.

[73] Assignee: Roblin Industries, Inc., Battle Creek, Mich.

[21] Appl. No.: 146,540

[22] Filed: May 2, 1980

[51] Int. Cl.³ ............................................. B62B 11/00
[52] U.S. Cl. ........................................... 280/33.99 R
[58] Field of Search ................. 280/33.99 S, 33.99 R, 280/33.99 H, 33.99 F, 33.99 A, 33.99 C, 47.34, 47.35; 186/65

[56] References Cited

U.S. PATENT DOCUMENTS

| | | | |
|---|---|---|---|
| D. 155,971 | 11/1949 | Concklin | 280/33.99 S X |
| D. 190,279 | 5/1961 | Hummer | 280/33.99 R X |
| 2,689,132 | 9/1954 | Kahn | 280/33.99 H |
| 2,898,123 | 8/1959 | Davis et al. | 280/33.99 R |
| 2,903,269 | 9/1959 | Hennion | 280/33.99 H |
| 2,906,542 | 9/1959 | Hoedinghaus et al. | 280/33.99 F |
| 2,918,294 | 12/1959 | Hennion | 280/33.99 A |
| 3,002,370 | 10/1961 | La Brie, Jr. | 70/183 |
| 3,028,931 | 4/1962 | Donovan | 186/65 |
| 3,039,783 | 6/1962 | Stanley | 280/33.99 H |
| 3,078,102 | 2/1963 | Sides | 280/33.99 H |
| 3,083,978 | 4/1963 | Foster | 280/47.34 |
| 3,190,673 | 6/1965 | Olander et al. | 280/33.99 R |
| 3,309,100 | 3/1967 | Barbuti | 280/33.99 H |
| 3,443,665 | 5/1969 | Zschaeck | 186/65 |
| 3,829,114 | 8/1974 | Cohen et al. | 280/33.99 R |
| 4,084,832 | 4/1978 | Upshaw | 280/33.99 S |

FOREIGN PATENT DOCUMENTS 2325685 12/1974 Fed. Rep. of Germany ... 280/33.99 A

OTHER PUBLICATIONS

Publication Entitled "United Model 1295", by United Steel and Wire National Carts.
Publication Entitled "United Model 595", by United Steel and Wire National Carts.
Publication Entitled "United Model 1976", by United Steel and Wire National Carts.

Primary Examiner—Joseph F. Peters, Jr.
Assistant Examiner—Milton L. Smith
Attorney, Agent, or Firm—Blanchard, Flynn, Thiel, Boutell & Tanis

[57] ABSTRACT

An improved base construction for a wheeled nestable shopping cart is provided by forming the base primarily from two U-shaped members. The first U-member has a planar portion disposed directly under the basket for supporting same, which portion terminates in downwardly directed rear legs which have the lower ends thereof joined to the rear wheel assemblies. The second U-member has the bight thereof forming the toe end of the base. The leg portions of this second member incline rearwardly and upwardly from the bight such that the free ends thereof are fixedly engaged with the rear legs adjacent the upper ends thereof. Side braces rigidly join the planar portion to the leg portions of the second member. This arrangement effectively prevents storage of goods on the base.

4 Claims, 4 Drawing Figures

CART WITH IMPROVED STORAGE-PREVENTING BASE

FIELD OF THE INVENTION

This invention relates to an improved base or underframe for a nestable shopping cart, which base is constructed to prevent storage of goods thereon, thereby greatly minimizing the possible use of the cart base as a means for pilfering goods.

BACKGROUND OF THE INVENTION

Pilferage of goods from supermarkets and department stores is a major cause of economic loss. Since the baskets of shopping carts are usually maintained spaced above the wheeled portion of the cart's base, the region below the shopping cart basket naturally lends itself to storage of merchandise that can be overlooked by checkout personnel.

In recognition of this long-standing problem, U.S. Pat. No. 3,829,114 discloses one attempt to frustrate use of the region below the cart basket to prevent pilferage. According to the structure of this patent, the wheeled portion of the cart base is provided with a plurality of upwardly inclined struts functioning as obstructions, which struts are added to the standard base of existing carts. While the structure of this patent has been commercially utilized on shopping carts and has proven at least somewhat successful in minimizing pilferage, nevertheless the utilization of additional inclined struts in the manner suggested by this patent is undesirable since it not only significantly adds to the cost of the cart, but it also results in the cart having an undesirable appearance.

U.S. Pat. No. 4,084,832 illustrates a further attempt at minimizing the pilferage problem by providing a cart base which attempts to minimize storage of goods thereon. The base of this latter patent has also been commercially utilized and, while it does minimize pilferage, nevertheless even this base is of less than optimum design in view of the additional manufacturing steps and hence expense involved. More specifically, the undercarriage or base disclosed in this patent utilizes two U-shaped tubular members, a first of which functions in a conventional manner as the basket support and as the terminals for the rear wheels, and the second of which supports the front casters and has leg portions formed in an inverted V-shape, the apex of which is welded to the basket support. Due to the rather complex configuration of the second U-shaped member, including the substantial number of bends and the required number of welded connections between the two U-shaped members (coupled with the additional welded reinforcement associated with each V-shaped portion of the second member), the overall manufacture and assembly of this base is rather time consuming and expensive.

Thus, the object of this invention is to provide an improved base or underframe construction for a nestable shopping cart, which base is extremely effective in minimizing or preventing storage of goods thereon so as to thereby greatly reduce loss due to pilferage. A further object is to provide an improved base, as aforesaid, which simplifies manufacture of the base in contrast to prior known anti-pilferage bases, thereby reducing the cost of the overall cart and at the same time providing a cart having a desirable appearance. These and other objects of the invention are accomplished by the simplified base construction of the present invention without interfering with the desired strength and rigidity of the cart or the nestability thereof with other like carts.

Further objects and advantages of the invention will be apparent hereinafter after reading the following description and inspecting the accompanying drawings.

Briefly summarizing the present invention, same comprises an improved base for a nestable shopping cart, which base provides an improved and simplified construction that has both nesting and anti-pilferage characteristics. The improved base or underframe is formed primarily by use of only two U-shaped tubular members, the first said member being conventional and having the bight and adjacent leg portions arranged generally planar and approximately horizontal so as to permit the basket to be supported directly thereon, with the portions of the legs that are distal from the bight being formed to extend downwardly so as to define laterally spaced upright legs, the lower ends of which are joined to the rear wheel assemblies. The second said U-shaped member has the bight thereof disposed directly adjacent but slightly above the caster plate which mounts thereon the front caster assemblies. The leg portions of this second member extend rearwardly and diverge slightly outwardly from the ends of its bight, and also incline upwardly and rearwardly from a location adjacent said bight to a point at which the rearward free ends of the legs directly engage and are fixedly secured to the leg portions of the first U-member in the vicinity of the upper ends of said upright legs. A short and approximately vertically extending brace has the upper end thereof fixedly secured to the leg of the first U-member substantially centrally thereof, and the lower end thereof is fixedly secured to the respective leg of the second U-member intermediate the length thereof. This brace, and its cooperation with the legs of the two U-shaped members, results in formation of a substantially triangular structure in the vicinity of the rear lower edge of the basket to provide the base with substantial strength and rigidity.

DETAILED DESCRIPTION

Figure 1:
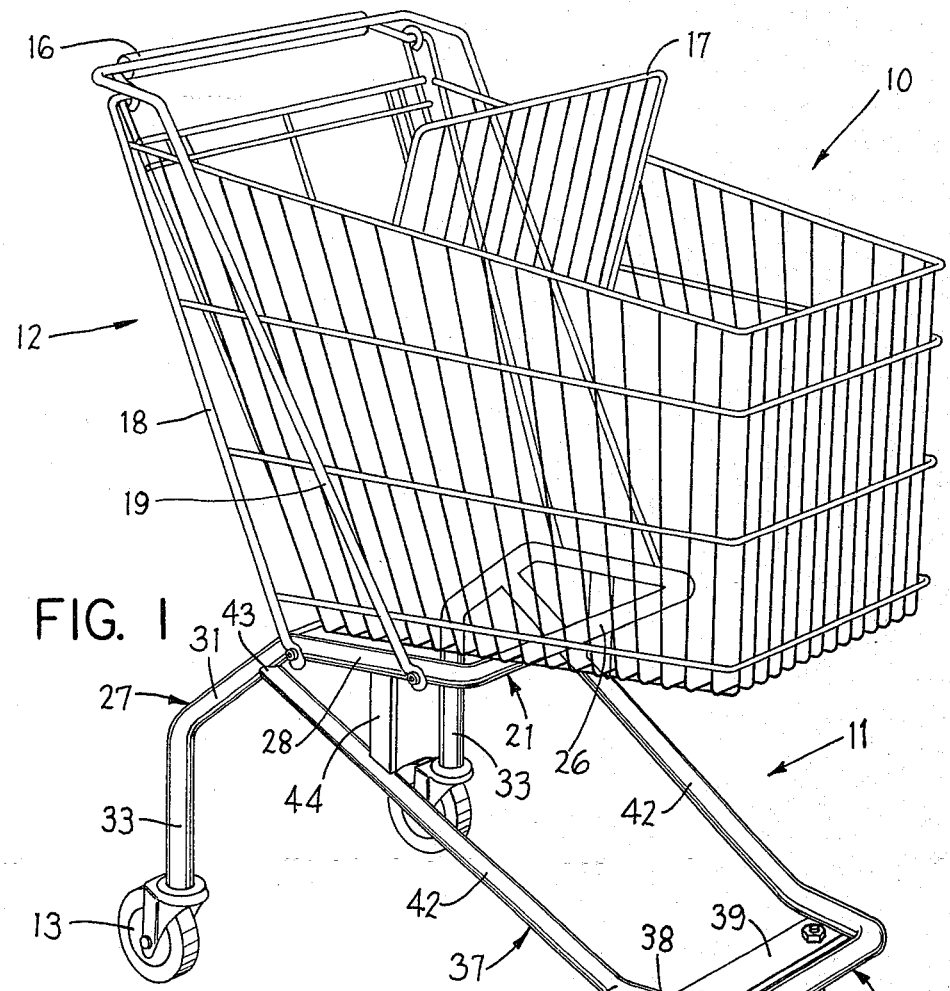
FIG. 1 is a perspective view of a nestable shopping cart provided with the improved base or underframe of this invention.

Referring to the drawings, wherein there is illustrated a preferred embodiment of the invention, FIG. 1 illustrates a nestable shopping cart 10 embodying the improved anti-pilferage base or underframe 11 of this invention. The cart 10 includes a conventional wire basket 12 fixedly seated atop the base 11, which base is equipped with a pair of rear wheel assemblies 13 and a pair of front caster assemblies 14. The basket 12 is of generally conventional construction and includes a handle 16 at the rear end thereof and a collapsible baby seat assembly 17 which cooperates with the rear or end wall of the basket. The basket is of a generally diverging configuration as it projects from the front end thereof to permit nesting with other like baskets. One or more heavy frame wires 18 and 19 are associated with the basket adjacent the rear sides thereof to permit the basket, in a conventional manner, to be fixedly secured to the base. Alternately, many conventional baskets utilize an elongated mounting plate associated with the lower portion of the basket for securing same to the base. The overall construction of the basket is conventional and, as is well known in the industry, can assume many different shapes and variations.

Considering now the improved base 11, same is formed principally by two U-shaped tubular steel members, the first being designated generally as 21, and the second being designated generally as 22.

The first U-shaped member 21 is a conventional portion of the cart base and functions primarily as a planar support for the basket 11. For this purpose, the U-shaped member 21 includes a bight 26 which extends transversely beneath the bottom of the basket at a location spaced forwardly from the rearward end thereof. This bight 26 extends between and integrally joins a pair of identical legs 27 which project rearwardly and downwardly with respect to the basket. The legs 27 include forward straight leg portions 28 which are integrally joined to the opposite ends of the bight, such as by means of an approximate 90° bend, which forward leg portions 28 are disposed adjacent the opposite sides of the basket and project toward the rear edge thereof. These forward leg portions 28 and the bight 26 define a generally planar support for the basket, which planar support is inclined slightly downwardly as it projects rearwardly as is conventional to permit nesting of like baskets. The front leg portions 28 are integrally joined, as by a bend 29, to intermediate leg portions 31 which project rearwardly and downwardly at an angle of approximately 45° relative to the horizontal. These intermediate leg portions 31 in turn are integrally joined, as by a further bend 32, to rear leg portions 33 which project substantially vertically downwardly and have the lower free ends thereof joined to the rear wheel assemblies 13.

The legs 27 generally diverge outwardly at a slight angle as they project rearwardly to facilitate cart nesting. While the illustrated U-member 21 is provided with two separate bends having the rather straight intermediate leg portion 31 therebetween, it will be appreciated that the leg portions 28 and 33 could be joined by a single arcuate portion bent about a substantially larger radius, if desired. When using a leg having the intermediate portion 31 as illustrated, the leg portions 31 and 33 obviously function substantially as the rear upright leg for the base.

Considering now the second U-shaped tubular member 22, it has a transversely extending bight 36 which is located at the toe or forward end of the cart, which bight 36 is spaced downwardly a substantial distance below the front end of the basket, being maintained slightly spaced upwardly from the floor by means of the front caster assemblies 14. The bight 36 has the opposite ends thereof integrally joined, through suitable bends, to a pair of identical elongated legs 37 which project rearwardly of the cart and are fixedly and rigidly secured to the first U-shaped member 21.

Figure 2:
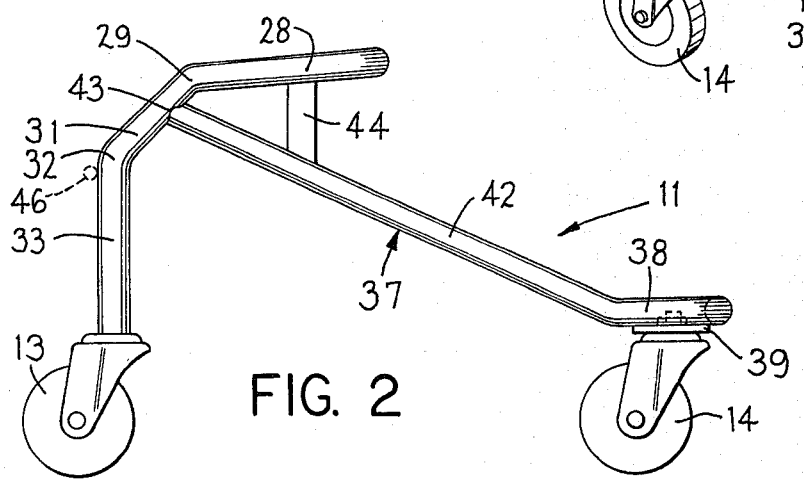
FIG. 2 is a side elevational view of the base.
Figure 3:
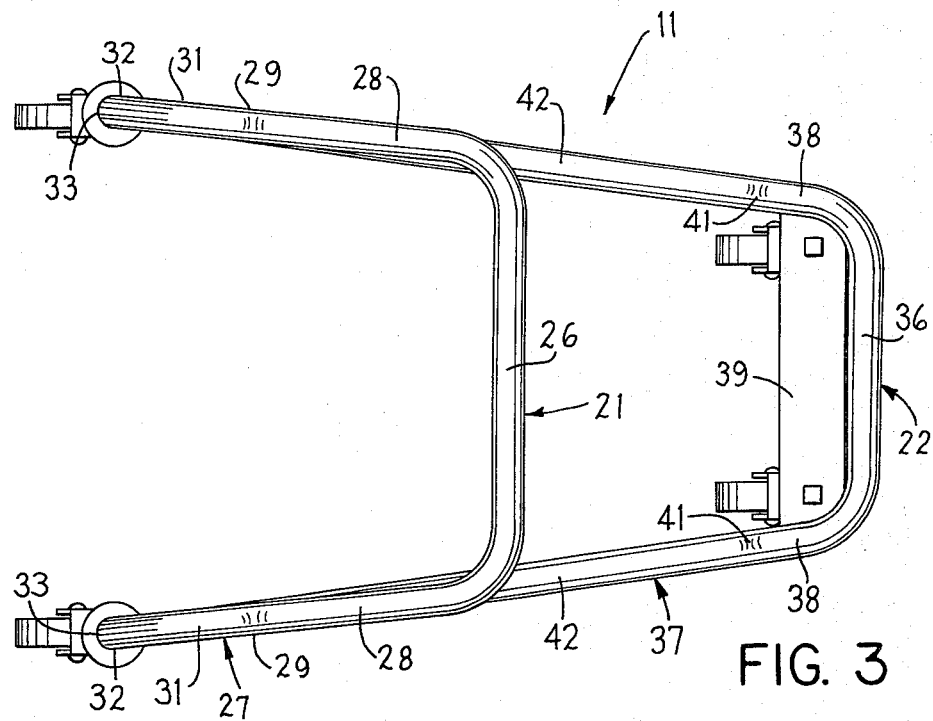
FIG. 3 is a top plan view of the base shown in FIG. 2.
Figure 4:
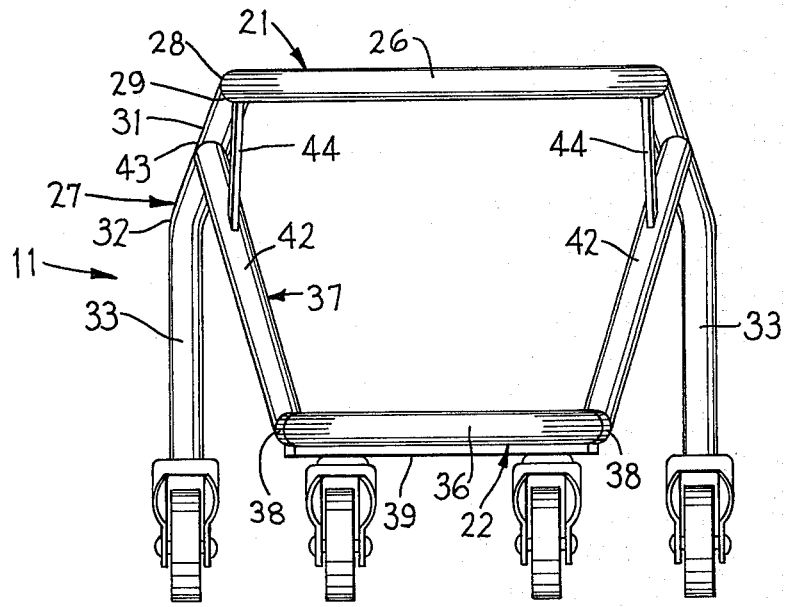
FIG. 4 is a front elevational view of the base shown in FIG. 2.

In the illustrated embodiment, each leg 37 preferably includes a short forward leg portion 38 which is integrally joined directly to the adjacent end of the bight 36, which leg portion 38 is disposed approximately horizontally so as to be substantially horizontally planar with the bight 36. These front leg portions 38 are provided to permit the front caster plate 39 to horizontally extend therebetween and be fixedly secured, as by welding, to the underside thereof. This front caster plate 39, which mounts thereon the front caster assemblies 14, is constructed as a narrow but elongated plate-like member disposed so that its forward edge is positioned as close as possible to the bight 36. This mounting arrangement also results in the upper surface of the caster plate 39 being disposed below the bight 36, as illustrated by FIG. 2, thereby effectively preventing the caster plate from being utilized as a supporting surface for goods.

The short front leg portions 38 in turn are integrally joined, as through a bend 41, to rear or primary leg portions 42 which are substantially straight and are inclined upwardly as they project rearwardly of the cart. These rear or primary leg portions 42, which comprise at least approximately 80% of the overall length of the legs 37, are inclined rearwardly and upwardly at a substantial angle such that the rear free ends 43 of the leg portions 42 are thus engaged with and rigidly secured to (as by welding) the legs 27 of the U-member 21 in the vicinity of the bends 29. This connection 43 is thus positioned in close proximity to the rearward ends of the leg portions 28, and hence in close proximity to the rearward lower edge of the basket 12.

The legs 27 and 37 of the two U-shaped members are additionally joined together by platelike reinforcing bars or braces 44, one of which is disposed adjacent each side of the base for joining one leg 27 to the respectively adjacent leg 37. This reinforcing bar 44 is positioned so that it extends approximately vertically and has the upper end thereof fixedly secured, as by welding, to the intermediate leg portion 28 at a location which is spaced from the bend 29, which location in the illustrated embodiment is somewhat centrally of the leg portion 28 along the length thereof. The lower end of reinforcing bar 44 is suitably secured, as by being welded, to the inclined leg portion 42 at an intermediate location therealong.

The legs 37 of U-member 22, as they project rearwardly from the bight 36, diverge outwardly at a slight angle so as to permit nesting of the cart with a like cart, in a conventional manner.

As is apparent from the attached drawings, the improved base 11 of this invention is of extreme simplicity, both structurally in terms of the individual components, and in terms of the manufacturing steps required since the base is formed primarily from the two U-members 21 and 22. Further, the U-member 22 has each leg 37 thereof rigidly joined to the corresponding leg 27 of the U-member 21 at only a single location, namely at the location 43 provided at the free end of each leg 37. This single direct structural connection between the legs 27 and 37, coupled with the provision of the brace 44 which extends between the leg portions 28 and 42, thus permits formation of a structurally strong and rigid triangle directly under the basket in the vicinity of the rearward portion thereof, resulting in the overall cart assembly having substantial rigidity and strength. This is achieved while utilizing an extremely simple structural arrangement which still provides a pleasing appearance, and also additionally effectively prevents pilfering due to the difficulty in supporting any goods on the base due to the substantial upward incline of the leg portions 42. Since the region between the leg portions is totally open, as is the sideward region between the leg portion 42 and the rearward leg portions 31 and 33, a customer is hence unable to effectively store any goods on the base.

It will be appreciated that the toe or nose end of U-member 22 can be formed in the manner illustrated by aforesaid U.S. Pat. No. 4,084,832, such as by eliminating the front leg portions 38 so that the bight 36 would thus be disposed forwardly of and downwardly from the caster plate 39. While this would eliminate formation of one bend associated with each leg 37, nevertheless such a construction is not preferred since this thus makes it more difficult to mount the caster plate in view of the upward incline of the legs. Further, this would also result in the upper surface of the caster plate defining an unobstructed support surface on which at least some goods could be positioned and stably supported. This latter potential pilferage problem is even further minimized with the improved base of this invention since, by positioning the caster plate 39 directly adjacent but below the bight 36, the caster plate does not define an effective support surface inasmuch as it is obstructed by the bight 36.

Each of the U-shaped members 21 and 22 is preferably formed from a single length of steel tubing having a circular cross section. This tubing, coupled with the fairly steep incline of the leg portions 42, thus effectively prevents storage of goods on the forward portion of the base 11. Further, the triangle formed by the brace 44 and its cooperation with the leg portions 28 and 42 is of a small and closely spaced nature, and hence effectively prevents storage of goods thereon or therebetween.

If necessary or desired, the rear of the base can be additionally strengthened and rigidified by providing a cross brace, such as rod 46 indicated by dotted lines in FIG. 2, which extends between and is rigidly connected to the rear leg portions 33.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a wheeled nestable shopping cart having a base and a goods-carrying basket supported thereon, the base including a generally planar basket support means that is operatively connected to but spaced above a pair of rear wheels and a pair of front casters, said base including a first U-shaped tubular member whose bight and adjacent portions of the legs of the U are shaped and arranged to provide the generally planar basket support means, and the portions of the legs of said first U-shaped member that are distal from the U's bight being formed to extend downwardly from the basket support means and terminating in laterally spaced upright legs positioned generally above the pair of rear wheels and to which said rear wheels connect, comprising the improvement wherein said base includes:

a second U-shaped member arranged and disposed so that its bight is spaced forwardly of and substantially below the basket support means, the second U-shaped member having elongated legs which extend rearwardly and diverge outwardly from the ends of the last-mentioned bight and being additionally arranged to incline upwardly and rearwardly from a point located adjacent said last-mentioned bight to a point at which the free ends of said last-mentioned legs directly fixedly engage a respective one of the legs of said first U-shaped member in the vicinity of the upper end of the respective upright leg, and a pair of rigid braces disposed adjacent opposite sides of the base for rigidly joining the basket support means to the legs of the second U-shaped member, each said brace having the upper end thereof rigidly joined to said leg portion of the planar basket support means and the lower end thereof rigidly joined to the inclined leg of said second U-shaped member at a location disposed intermediate the ends thereof, the region extending sidewardly between the legs of said second U-shaped member being open to prevent storage of goods on said base, the region extending between the upright leg of the first U-shaped member and the inclined leg of said second U-shaped member also being open and free of structure to prevent storage of goods on the base.

2. In a wheeled nestable shopping cart having a base and a goods-carrying basket supported thereon, the base including a generally planar basket support means that is operatively connected to but spaced above a pair of rear wheels and a pair of front casters, said base including a first one-piece U-shaped tubular member whose bight and adjacent portions of the legs of the U are shaped and arranged to provide the generally planar basket support means, and the portions of the legs of said first U-shaped member that are distal from the U's bight being formed to extend downwardly from the basket support means and terminating in laterally spaced upright legs positioned generally above the pair of rear wheels and to which said rear wheels connect, comprising the improvement wherein said base includes:

a second one-piece U-shaped member arranged and disposed so that its bight is spaced forwardly of and substantially below the basket support means, the second U-shaped member having elongated legs which extend rearwardly and diverge outwardly from the ends of the last-mentioned bight and being additionally arranged to incline upwardly and rearwardly from a point located adjacent said last-mentioned bight to a point at which the free ends of said last-mentioned legs directly fixedly engage a respective one of the legs of said first U-shaped member in the vicinity of the upper end of the respective upright leg, the region extending sidewardly between the legs of said second U-shaped member being open to prevent storage of goods on said base;

the second U-shaped member having front leg portions disposed directly adjacent the opposite ends of its bight which project horizontally rearwardly through a short distance to said point at which the legs of said second U-shaped member then incline upwardly and rearwardly, and a front caster plate extending directly between and being rigidly joined to the undersides of said front leg portions so that the front edge of said front caster plate is disposed directly adjacent the bight of said second U-shaped member, said last-mentioned bight projecting upwardly above the upper surface of the front caster plate to effectively prevent goods from being stably supported thereon.

3. A shopping cart according to claim 2 wherein the region extending between the upright leg of the first U-shaped member and the inclined leg of said second U-shaped member is free of structure which would permit storage of goods on the base.

4. In a wheeled nestable shopping cart having a base and a goods-carrying basket supported thereon, the base including a generally planar basket support means that is operatively connected to but spaced above a pair of rear wheels and a pair of front casters, said base including a first U-shaped tubular member whose bight and adjacent portions of the legs of the U are shaped and arranged to provide the generally planar basket support means, and the portions of the legs of said first U-shaped member that are distal from the U's bight being formed to extend downwardly from the basket support means and terminating in laterally spaced upright legs positioned generally above the pair of rear wheels and to which said rear wheels connect, comprising the improvement wherein said base includes:

a second U-shaped member arranged and disposed so that its bight is spaced forwardly of and substantially below the basket support means, the second U-shaped member having elongated legs which extend rearwardly and diverge outwardly from the ends of the last-mentioned bight and being additionally arranged to incline upwardly and rearwardly from a point located adjacent said last-mentioned bight to a point at which the free ends of said last-mentioned legs directly fixedly engage a respective one of the legs of said first U-shaped member in the vicinity of the upper end of the respective upright leg, and a pair of rigid braces disposed adjacent opposite sides of the base for rigidly joining the basket support means to the legs of the second U-shaped member, each said brace having the upper end thereof rigidly joined to said leg portion of the planar basket support means and the lower end thereof rigidly joined to the inclined leg of said second U-shaped member at a location disposed intermediate the ends thereof, the region extending sidewardly between the legs of said second U-shaped member being open to prevent storage of goods on said base, the region extending between the upright leg of the first U-shaped member and the inclined leg of said second U-shaped member also being open and free of structure to prevent storage of goods on the base; and the second U-shaped member having front leg portions disposed directly adjacent the opposite ends of its bight which project horizontally rearwardly through a short distance to said point at which the legs of said second U-shaped member then incline upwardly and rearwardly, and a front caster plate extending directly between and being rigidly joined to the undersides of said front leg portions so that the front edge of said front caster plate is disposed directly adjacent the bight of said second U-shaped member, said last-mentioned bight projecting upwardly above the upper surface of the front caster plate to effectively prevent goods from being stably supported thereon.

* * * * *